Sept. 18, 1962   L. B. JOHNSTON   3,054,714
METHOD OF PRODUCING PANELS OF FIBROUS GLASS
Filed Feb. 3, 1958   2 Sheets-Sheet 1
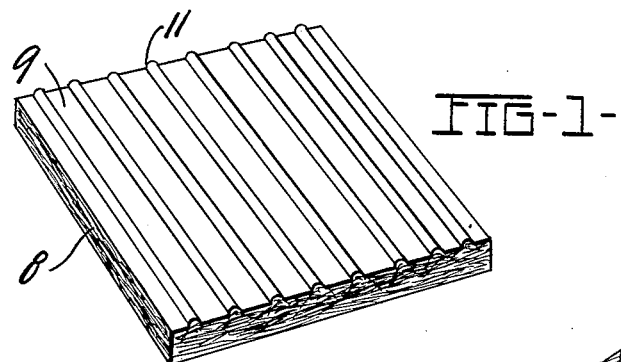
FIG-1-
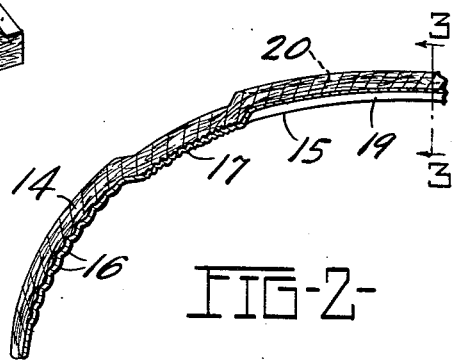
FIG-2-
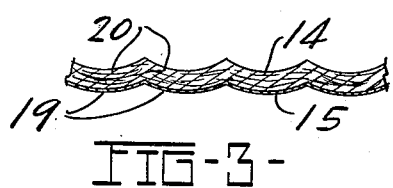
FIG-3-
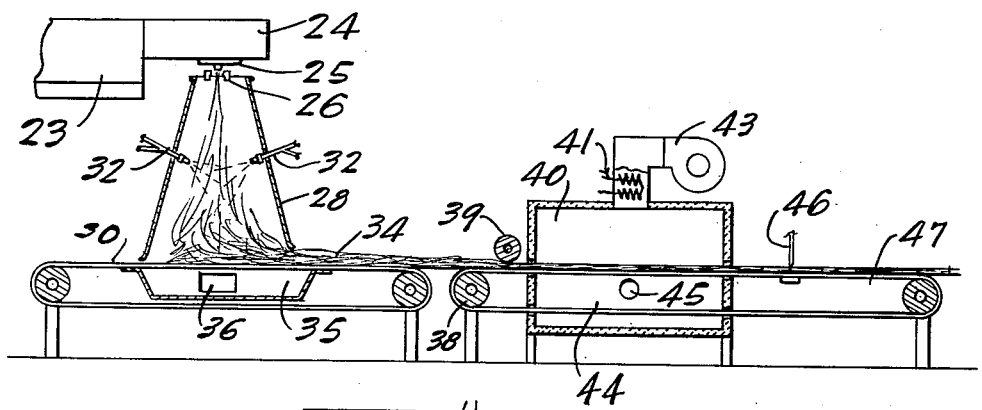
FIG-4-
INVENTOR.
LOWELL B. JOHNSTON.
BY
ATT'YS.

Sept. 18, 1962  L. B. JOHNSTON  3,054,714
METHOD OF PRODUCING PANELS OF FIBROUS GLASS
Filed Feb. 3, 1958  2 Sheets-Sheet 2
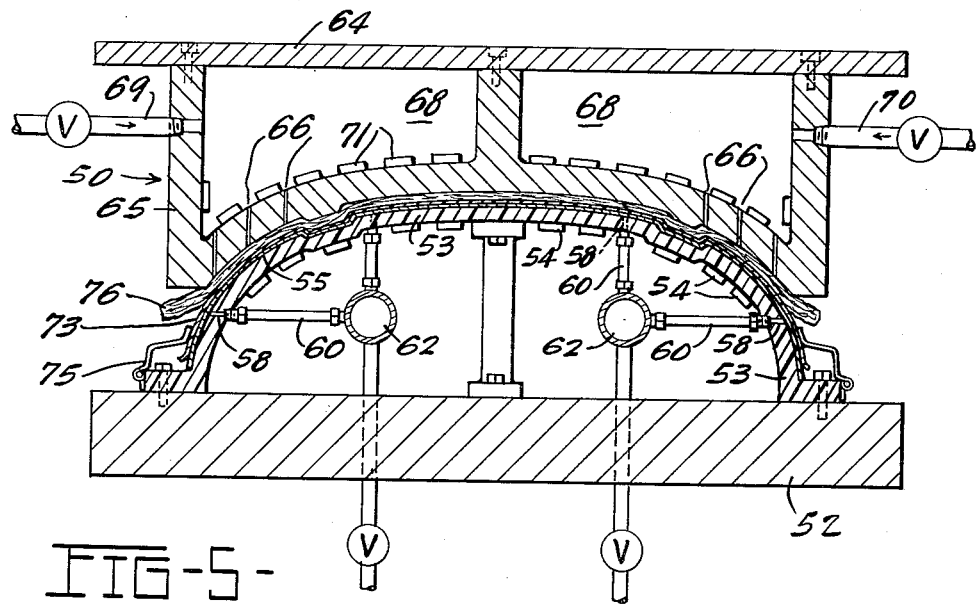
FIG-5-
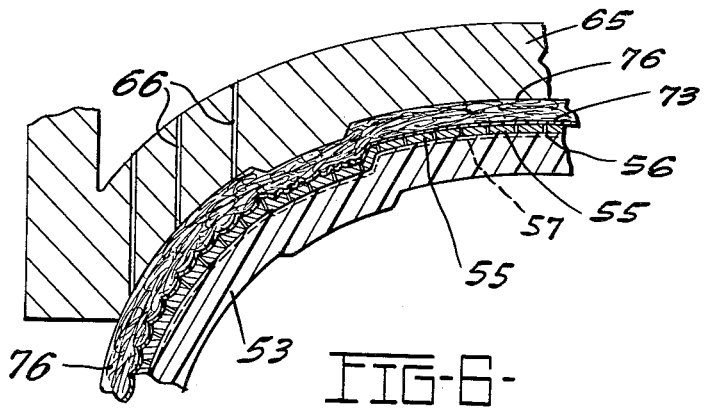
FIG-6-
INVENTOR:
LOWELL B. JOHNSTON.
BY
ATT'YS.

United States Patent Office 3,054,714
Patented Sept. 18, 1962

3,054,714
METHOD OF PRODUCING PANELS OF FIBROUS GLASS
Lowell B. Johnston, Newark, Ohio, assignor to Owens-Corning Fiberglas Corporation, a corporation of Delaware
Filed Feb. 3, 1958, Ser. No. 712,771
6 Claims. (Cl. 156—212)

This invention relates to panels of fibrous glass with attached covering sheets having ornamental surface configurations, and particularly to a method of producing such panels. While this invention may be utilized to advantage in forming flat panels for wall or ceiling installation, its benefits are more fully realized in connection with the fabrication of panels of more complex shapes such as those used as crash pads or head liners in automobile bodies.

Because of the environment with which these panels are associated they should be capable of yielding under impact and should be pleasing in appearance. The resilience, strength and durability of glass fiber masses make them especially suitable as the body portions of these products; and a covering sheet of vinyl or of a similar plastic has the pliability to comply with the desired compressibility, and is capable of being impressed with an embossed pattern or other surface design for ornamental purposes. The desired decorative configurations may range from a fine grain effect to broad ribs or grooves, and in ornate panels for automobile headliners, may consist of a combination of various forms, including, for example, extensive pebbled areas framed by heavy ribs, and with a border of narrow, closely positioned grooves.

Considerable trouble has been encountered in producing fibrous glass panels with such decorative covering sheets. In a procedure utilizing preformed sheets, it has been found that smooth fitting of the sheet upon curved panels is very difficult. Also, with sheets in which the decorative surface has been first impressed, the lack of correspondingly shaped backing material under the embossed figures causes them to have a loose, flabby nature. Simultaneous forming of the fibrous glass body and impression of the configuration in the covering sheet with the sheet in place upon the fibrous glass stock has also been attempted with little success.

Characteristics of both the preferred thermoplastic vinyl sheeting and of the fibrous glass pack have contributed to the discouraging results with these procedures. Vinyl material is conventionally shaped while heated, and upon cooling is inclined to contract and return to its original form. This tendency may impair surface configurations unless the sheeting is firmly held in its embossed state, particularly while being cooled, and in some cases, subsequent thereto as well.

Another factor that has contributed to the unsatisfactory results so far experienced is that an uncured mass of fibrous glass has little pliability or resilience and is therefore a poor backing agent for impelling the vinyl sheeting against embossed or intaglio designs in a mold surface.

The prime purpose of this invention is to provide an effective method of creating a fibrous glass body with an attached covering sheet in which the sheet is drawn by vacuum against a mold with the selected surface configuration.

A further object is the provision of such a method in which the fibrous glass stock is submitted to a special preparatory treatment.

The method by which the recited, as well as additional objects are attained, includes the employment of a mold, one part of which has been engraved with the surface design to be impressed upon the covering sheet and is ported for the application of vacuum to the underside of a sheet laid thereon. In its preferred form, the method further includes a partial, preliminary curing of the binder constituent of the fibrous glass pack selected for the body of the panel to be fabricated.

Supplemental features of the method reside in the application of curing heat down one part of the mold while limiting heat transfer from the other mold element; and the use of a covering sheet of thermoplastic composition in combination with a thermosetting glass fiber binder, and a thermosetting sheet adhesive.

The method is described in more detail, hereafter, and illustrated in the accompanying drawings in which:

FIGURE 1 is a perspective view of a generally flat panel which may be produced with the method of this invention;

FIGURE 2 is a partial, longitudinal section of an automobile head liner, an example of a curved panel which may be advantageously fabricated with the subject method;

FIGURE 3 is a vertical section of the head liner of FIGURE 2 taken on the line 3—3 thereof;

FIGURE 4 is a diagrammatic showing of a conventional fibrous glass forming line adapted to create a pack of glass fibers utilizable in the method of this invention;

FIGURE 5 is a vertical section of a mold with which the subject method may be practiced; and FIGURE 6 is an enlargement of a portion of the sectional view of FIGURE 5.

Referring to the drawings in more detail, the flat panel of FIGURE 1 has a main body 8 composed of bonded fibrous glass and an adhered covering sheet 9. Such a panel is ordinarily used in banked series for wall and ceiling surfacing and has properties of sound absorption and heat insulation. This plain type of panel may be advantageously produced by the method of this invention when the covering sheet 9 has fairly pronounced intaglio or relief designs such as the ribs indicated at 11.

If the rib formation is created in the sheeting before the latter is secured to the glass fiber base, there would be no backing to maintain the shaped rib contour. The projecting rib structure would ordinarily have insufficient self-supporting properties and could be crushed easily. Following the method of this invention, the covering sheet of vinyl composition is shaped and attached to the fibrous glass body as the latter is compressed and the configurations in the sheet are then supported by like shaping of the fibrous stock.

The head liner panel of FIGURES 2 and 3 is designed for placement against the inner side of the roof of an automobile body. The fibrous glass of this panel not only serves as an acoustical and heat insulating agent, but also has a cushioning effect should a passenger of the vehicle bump against it. The benefits of this invention are more fully realized with such a panel because of the difficulties ordinarily experienced in the fabrication of a fibrous glass article with compound curvatures, and also because the covering sheet preferably incorporates a combination of embossed and indented configurations.

The fibrous glass portion 14 of the headliner panel of FIGURES 2 and 3 varies in thickness, and the covering sheet 15 has a lower portion with comparatively small, parallel ribs 16; an adjacent area 17 decorated with a pebble effect; and ridges 19 of substantial size in a central portion.

The fibrous glass pack from which such panels are constructed may be produced in a standard forming line as depicted diagrammatically in FIGURE 4. The furnace 23 has a forehearth section 24 from which the molten glass is projected in fine streams through multiple ports in bushings 25. High pressure steam or air discharged from associated manifolds 26 attenuate the streams of glass into fine fibers. The latter fall in a random arrangement down within the forming hood 28 and collect in a web or pack upon the foraminous surface of the traveling conveyor 30, which passes across the bottom of hood 28.

During the downward movement of the fibers, particles of a bonding agent are interspersed among the fibers by spray devices 32. The binder is preferably a phenol formaldehyde resin extended about twelve percent by an addition of vinsol, a turpentine rosin derivative. The proportion of the binder is preferably between ten and twenty-six percent by weight of the final cured pack.

The size of the glass fibers produced in a production line such as that illustrated may vary within a wide range and yet serve adequately as stock in the practice of this invention. Should it be desired to utilize fibrous glass packs of particularly fine fibers, for example with diameters below twenty-five hundred thousandths of an inch, the production line would then conventionally incorporate either centrifugal or combustion gas type of fiber forming apparatus.

The formed pack 34 of glass fibers has a density of no more than a few pounds per cubic foot, and for purposes of this invention, a thickness of approximately two to three inches. Air movement down through the conveyor promotes the deposit of the fibers thereon, and also provides a control medium for the pack density. The air is drawn into suction box 35 and through its outlet 36 by a suitable fan or blower. The pack 34 is delivered by conveyor 30 to a second conveyor 38 and carried by the latter under a levelling roller 39 and through a short curing oven 40.

While traveling through oven 40, air heated by elements 41 is propelled down through the pack by blower 43. This air is exhausted through outlet 45 of the suction chamber 44 situated below the upper flight of conveyor 38. In the practice of this invention the heat applied in oven 40 is only sufficient to partially cure the bonding agent of the fibrous glass pack. This heat treatment may be accomplished without air movement as the semi-curing need not penetrate very far into the pack for the purposes of this invention.

After the pack leaves oven 40 on conveyor 38 it is cut to desired lengths by a vertically reciprocating knife 46. It may also be sliced longitudinally by a suitable revolving disc. The cut lengths are taken from the delivery end 47 of the conveyor for transfer to a mold 50 such as that shown in FIGURES 5 and 6.

The mold 50 has a stationary lower platen 52 upon which is mounted the lower mold part 53 and its overlying, pattern-carrying shell 55. The latter is preferably composed of an epoxy plastic with a coating of sprayed metal, and has electrical heating elements 54 attached to its under side. In the shell 55 are spaced drillings 56, one-sixteenth of an inch, or less, in diameter, which provide suction paths for air drawn from the surface of the shell down across the grooves 57 on the upper surface of the main mold body 53. From the grooves 57 the air moves through passages 58 and connecting tubes 60 to vacuum tanks 62.

Secured to the reciprocable upper platen 64 of the mold 50 is mold member 65. The latter is interiorly chambered and has a series of passages 66 through which heated air is delivered for curing the binder of the fibrous glass stock. The air reaches the chambers 68 within mold member 65 through supply piping 69 and 70 which must be flexible to follow the movement of the upper mold. The forming portion of mold member 65 as well as the air passing through chambers 68 are heated by a series of electrical elements 71.

In practicing this invention the vinyl sheet 73, of which the cover of the head liner is to be formed, is preferably composed of a vinyl chloride-acetate resin in view of the established qualities of long wear and appearance of this material and also because it may be formed under heat. While the bonding agent of the glass stock, when present in high quantity, may be utilized as an adhesive to attach the sheeting to the fibrous glass stock ordinarily a light coating of a special fast setting adhesive, such as one having a synthetic rubber and phenolic resin composition, is applied to the sheet before it is brought to the mold. With the sheet laid over the lower mold 53 the suction provided by the air exhausted through ports 56 draws the sheet in close conforming relation against the configured surface of the shell 55. Clamps 75, which may be of spring type, hold the edges of the sheet in sealing relation with the mold.

With the vinyl facing element firmly set in place, the glass fiber blank 76 is positioned thereover. The slight curing received by the binder of the fibrous glass pack in oven 40 tends to stiffen at least the surface portions of the blank 76 giving the glass fibers a somewhat bristling, resilient character. In addition to the fact that the blank is thus made less sticky for the hand loading operation, it is also less likely to adhere to the upper mold 65 when the latter is brought down in compressing contact with the blank. Accordingly the fibrous stock is more inclined to move smoothly under the compacting pressure. The increased resilience of the glass fiber mass is of further benefit as it aids the entry of the fibers into the configurations of the suction-held sheeting and more forcibly holds the sheeting in place.

Because of the varying thickness of the head liner panel the glass wool is compressed to different densities which may range as high as forty pounds per cubic foot along the edge of the panel where extra mounting strength is desired.

In order to speed up the curing of the fibrous glass binder the heating elements 71 are arranged to heat the upper mold member 65 to a temperature of approximately 550° Fahrenheit. The air traveling down through passages 66 is consequently raised to a like temperature. The air carries the heat through the fibrous mass and escapes through the free edges of the pack.

The binder is accordingly rapidly brought to its curing temperature of at least 250° and becomes set in a matter of several minutes. Before this high heat reaches the lower mold part 53, the operation must be terminated and the mold opened as the vinyl sheet 73 melts at 350° F. For this reason it is desirable to warm the sheet only to a softening extent whereby it conforms more readily with the surface design of shell 55. A moderate temperature is also sufficient to set the synthetic rubber-resin adhesive whether it is cured chemically by heat or is the type which sets through evaporation of a liquid vehicle. This low temperature may be obtained through the auxiliary heating elements 54 or, more desirably, be derived from the heated air from the upper mold.

The release of mold must be within a period of about fifteen seconds extending between the time when the fibrous glass binder has set and the point when damaging heat reaches the vinyl sheet.

As pictured in FIGURE 6 the glass fiber stock is forced down into the indentations of the vinyl sheet and acts as a backing support to maintain the impressed configurations in the sheet. Where the surface design includes large formations of scallops or ridges the upper mold may be complementarily contoured to better direct the glass fiber stock into conforming shape. The back of the panel will then carry the developed design as is the case of the panel illustrated in the section of FIGURE 3.

The setting of the resinous adhesive not only acts to hold the fibers to the sheet but also has a stiffening effect. As the glass fibers do not accommodate themselves to a small pebble or grain texture, the adhesive serves alone in strengthening such impressions in the vinyl covering film.

In summarizing the features of this invention, of major importance is the concise fitting of the vinyl sheet to the desired design through the action of the vacuum system; and, then, with the sheet, so impressed and embossed, the impelling of the fibrous glass stock in conforming contour against the sheeting. The curing of the fibrous glass binder and the adhesive immediately follows to permanently fix and maintain the decorative configurations in the sheeting.

The partial preliminary curing of the fibrous binder adds to the success of the process by improving the action of the fibrous glass in the molding operation. Of supplemental significance is the special molding technique which provides for the curing of the thermosetting binder while simultaneously shaping the thermoplastic film at a moderate temperature.

It is apparent that, within the scope of the invention, modifications and different arrangements may be made other than is herein disclosed, and that the present disclosure is illustrative only.

In regard to materials involved, it should be acknowledged that various other fibrous glass bonding agents are well known and would be equally effective. Likewise, adhesive materials other than the synthetic rubber-phenolic resin preparation could be easily adapted to the practice of this invention. Similarly, other plastic films would approach or might excel in performance the vinyl chloride acetate here favored. Also it is recognized that other mineral wools are similar though usually inferior in properties to glass wool and may be substituted therefor in some instances without too severe an effect upon the resulting products.

Accordingly, it is desired that the accompanying claims be interpreted sufficiently broadly to encompass obvious alternate materials and natural modifications in the processing procedure as herein described.

I claim:

1. The method of forming an air permeated panel of bonded fibrous glass with an attached covering sheet carrying a decorative surface configuration which comprises placing a formable sheet over a mold surface engraved with the design desired in the covering sheet, first drawing the forming sheet by suction applied under the sheet into intimate conformance with the engraved surface, laying a porous, compressible blank of fibrous glass impregnated with a heat curable binder upon the formable sheet, then by applying force, other than suction induced atmospheric pressure, against the opposite side of the blank compressing the blank against the formable sheet, and, with the blank compressed, applying binder curing heat thereto, the compresison of the blank cooperating with the suction in forcing the formable sheet into conformance with the engraved surface and the application of binder curing heat serving to set the binder and thus permanently hold the sheet contacting portion of the blank in the configuration of the engraved surface and the covering sheet.

2. The method according to claim 1 in which, as a preliminary step, sufficient heat is applied to the fibrous glass blank to partially cure the binder before the blank is laid upon the sheet, whereby the blank is resiliently stiffened to a degree making it more effective in forcing the formable sheet into conformance with the engraved surface.

3. The method according to claim 1 in which the formable sheet is coated with a heat settable adhesive before the fibrous glass blank is laid thereupon.

4. The method according to claim 1 in which the binder curing heat is applied to the side of the fibrous glass blank away from the formable sheet and the forming operation is terminated before the heat fully reaches the formable sheet.

5. The method of producing an air permeated panel of bonded fibrous glass with an attached covering incorporating an impressed surface design comprising placing a thermoplastic sheet over a mold engraved with the desired design, drawing the sheet by vacuum applied under the sheet into intimate contact with the engraved mold, superimposing a porous, compressible blank of fibrous glass impregnated with a heat curable binder upon the sheet, then, by applying force, other than vacuum induced atmospheric pressure, against the opposite side of the blank compressing the blank against the sheet, applying heat to the outer side of the blank at a temperature high enough to cure the binder but sufficient to damagingly affect the thermoplastic sheet, and terminating the compressing action and the application of heat before the heat fully reaches and damagingly affects the thermoplastic sheet.

6. The method of creating a configured surface upon an air permeated, compressed body of fibrous glass which comprises placing a formable sheet upon a mold engraved with the desired surface configuration, first forcing the formable sheet by applying vacuum under the sheet, alone, into conforming relation with the mold and so imposing upon the sheet the desired configuration, placing a porous, compressible blank of fibrous glass impregnated with a settable binder upon the formable sheet, then compressing the blank against the formable sheet in supporting relation with the configuration imposed thereon, and, while the blank is so compressed, setting the binder in the blank and adhering the formable sheet to the blank.

References Cited in the file of this patent

UNITED STATES PATENTS

| | | |
|---|---|---|
| 2,478,267 | Hickler | Aug. 9, 1949 |
| 2,493,439 | Braund | Jan. 3, 1950 |
| 2,590,221 | Stevens | Mar. 25, 1952 |
| 2,782,458 | Emmert et al. | Feb. 26, 1957 |
| 2,784,763 | Shorts | Mar. 12, 1957 |
| 2,815,309 | De Ganahl et al. | Dec. 3, 1957 |
| 2,881,110 | Walker et al. | Apr. 7, 1959 |